(12) United States Patent
Meglino et al.

(10) Patent No.: US 6,293,046 B1
(45) Date of Patent: *Sep. 25, 2001

(54) LANDSCAPE EDGING

(76) Inventors: Don A. Meglino; James V. Meglino, both of 100 Frank Rd., Hicksville, NY (US) 11802

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/134,714

(22) Filed: Aug. 14, 1998

(51) Int. Cl.[7] ................................................. A01G 1/00
(52) U.S. Cl. ....................................................... 47/33
(58) Field of Search ................................................ 47/33

(56) References Cited

U.S. PATENT DOCUMENTS

| | | |
|---|---|---|
| 113,145 | 3/1871 | Dickson et al. . |
| 761,979 | 6/1904 | Moylan . |
| 3,491,660 | 1/1970 | Kwasney . |
| 3,495,352 | 2/1970 | Sbare . |
| 3,788,001 * | 1/1974 | Balfanz, Jr. ............................. 47/33 |
| 4,858,379 * | 8/1989 | West ........................................ 47/33 |
| 4,945,675 | 8/1990 | Kendrick . |
| 5,067,273 * | 11/1991 | Richwine ............................... 47/33 |
| 5,442,877 | 8/1995 | Lindhal . |
| 5,675,930 | 10/1997 | Cooper . |
| 5,715,628 * | 2/1998 | Beladakis ............................... 47/33 |
| 5,720,128 * | 2/1998 | Smith et al. ........................... 47/33 |

* cited by examiner

*Primary Examiner*—Charles T. Jordan
*Assistant Examiner*—Kevin Jakel
(74) *Attorney, Agent, or Firm*—Galgano & Burke

(57) ABSTRACT

Landscape edging comprising a plurality of elongated border sections each having end portions which are disposed proximate to each other, and, a cover disposed over the top of a seam created by adjacent border sections. Another aspect comprises decorative elements movably positionable along a visible portion of the landscape edging allowing users of this landscape edging, whether landscapers or consumers, to create their own decorative design.

39 Claims, 3 Drawing Sheets

LANDSCAPE EDGING

The present invention is directed to landscape edging, and is particularly suitable for the use of landscape edging shipped in discrete sections.

BACKGROUND OF THE INVENTION

The landscape edging to separate different portions of a lawn or garden, in general, has been known for many years. Various pre-fabricated borders have been disclosed, for example, in U.S. Pat. No. 113,145 entitled Garden Bed Border issued in 1871 for Tongue and Groove Garden Border sections formed of brick, concrete or artificial stone, with provisions for flower pots between the sections. U.S. Pat. No. 761,979 discloses a mound border useful for graves.

More recently, various types of landscape edging have been disclosed which incorporate lighting fixtures and water sprinklers within the structure of the landscape edging. For example, landscape edging including one or more of these features are disclosed in U.S. Pat. No. 3,495,352 to Sbare, U.S. Pat. No. 3,491,660 to Kwasney, U.S. Pat. No. 4,945,675 to Kendrick, U.S. Pat. No. 5,442,877 to Lindhal and U.S. Pat. No. 5,675,930 to Cooper. The edging in these various patents generally comprise multiple parts which are costly to manufacture and therefore, ultimately costly to the consumer. These various sections do not lend themselves to formation as a single extrusion.

More recently, various forms of landscape edging have been formed by extrusion. Those skilled in the art appreciate that it is less expensive to form sections of lawn edging by extrusion processes than to mold individual sections or to assemble many pieces to form a single border section as required by various borders shown in the patents references above. Extruded landscape edging sections have been shipped as twenty foot coils or in shorter, e.g. four to six foot, sections. One advantage of the use of shorter straight sections is that they take up less space during shipping and when on display at a retail store. The use of several shorter sections to form a twenty foot section of border, however, creates a number of "seams" at the juncture of two adjacent edge sections. As used herein, the term "seams" is used to indicate a visible discontinuity in the assembled lawn edging between two adjacent sections. Therefore, a "seam" will be created by the abutment of two adjacent sections, if the sections are not actually abutting, if the edges of adjacent border sections are overlapping, etc.

The existence of a greater number of visible seams is undesirable to some consumers. Therefore, it would be desirable to provide lawn edging which has the portability of shorter edge sections, but which does not have many visible seams.

Another disadvantage of the previously disclosed systems was that, to a large extent, their designs were set by the manufacture. Some consumers, however, prefer to be able to add their own touches of creativity to their landscape edging. Therefore, it would also be desirable to provide decorative elements which are selectively positionable on a lawn edging.

SUMMARY OF THE INVENTION

Various embodiments of the present invention are directed to landscape edging comprising a plurality of elongated border sections each having end portions which are disposed proximate to each other, and, a cover disposed over the top of a seam created by adjacent border sections.

According to another aspect of the present invention, one, and preferably a plurality of, decorative elements are movably positionable along a visible portion of landscape edging. According to this embodiment, end users of this landscape edging, whether landscapers or consumers, can create their own decorative design.

DETAILED DESCRIPTION OF THE PREFERRED EMBODIMENTS

Figure 1:
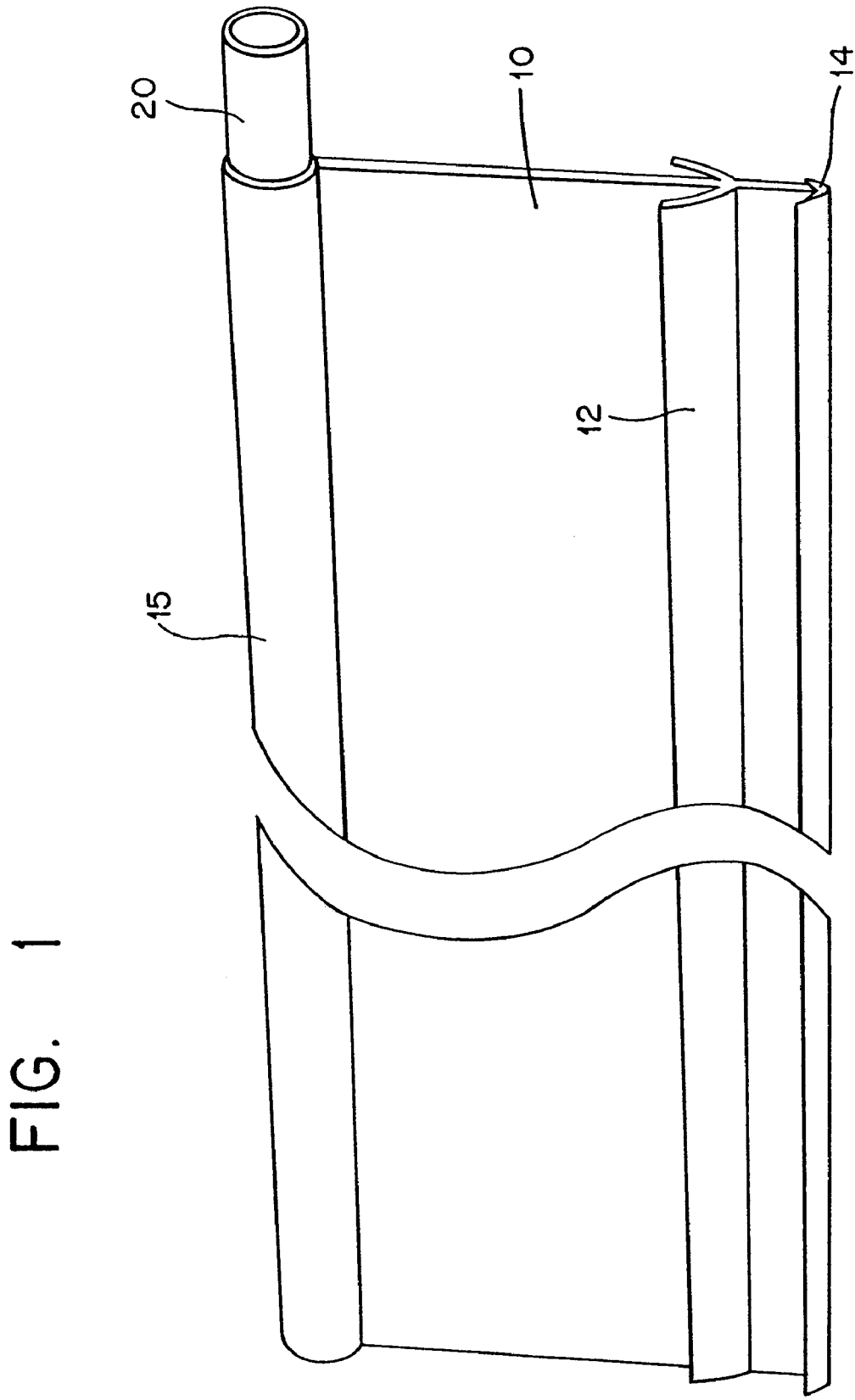
FIG. 1 is a perspective view of a known section of lawn edging, with an inserted connector elements.

The various embodiments of the present invention are directed to lawn edging and are useful with lawn edging of various sizes and shapes, particularly landscape edging formed as extruded sections, herein referred to as "extrusions". For purposes of illustration, FIG. 1 shows one form of known landscape edging which is formed in extruded sections. As noted above, some landscape edging was presently marketed as long rolls, for example, 20 feet in length. When used, these rolls need to be straightened by the installer. The memory of the particular polymer used in forming these rolls can pose difficulties in installation, particularly when the installation is performed by a single person. Moreover, the shipment of edging in rolls tends to take up more space than a plurality of flat sections which can be nestled in a rectangular box. The advantages of the various aspects of the present invention are not limited to any one particular length of lawn edging nor to any particular shape. The illustrated embodiments are merely provided for purposes of illustration.

The landscape edging of FIG. 1 comprises a substantially laminar body section 10, a plurality of lower extensions 12 and 14 which serve to facilitate insertion of the edging into the ground while also serving to anchor the edging after it has been installed. The upper section of this illustrated landscape edging section comprises a substantially tubular portion 15. In FIG. 1, a separate connector 20 has been inserted into tubular upper portion 15 in order to facilitate connection with an adjacent edge portion.

Figure 2:
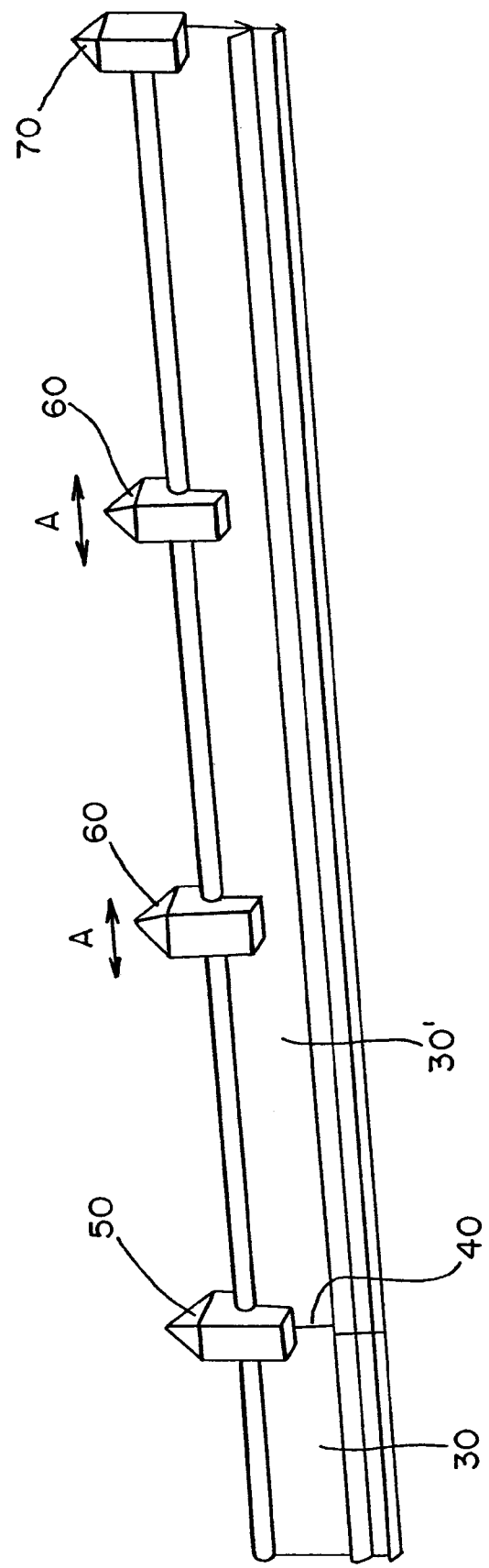
FIG. 2 is a perspective view showing two aspects of the present invention.

FIG. 2 illustrates the embodiments of the present invention as used with two adjacent border sections 30 and 30' of the type shown in FIG. 1. The upper, visible portion of the seam 40 created by the abutment of the adjacent border sections is covered by a decorative cover 50. While cover 50 of this illustrated embodiment of the present invention is shown having a general pyramidal post shape, any other shapes, such as, balls, crowns, squares, rectangles, etc., can be used without departing from the scope of the present invention. The illustrated cover 50 can be readily chosen to match other architectural elements of the particular area, such as fencing or architectural features of any nearby structures, e.g., houses, office buildings, etc. The illustrated cover 50 not only conceals the seam created by adjacent border sections but also adds an attractive decorative element to the landscape edging.

Those skilled in the art will appreciate that a substantial portion of a landscape edging section will typically be covered by earth, dirt, grass, etc., after the edging has been installed. Therefore, it is not necessary to extend cover 50 all the way down to the bottom of the edging. It is, nonetheless, within the scope of the present invention to use covers of different widths and/or lengths as desired. It will be understood that it is most advantageous to provide a cover having sufficient depth to conceal the visible portion of the seam after the edging has been installed. According to a non-illustrated embodiment, the lower section of the cover need not be substantially flat but is tapered or take another desired configuration.

In addition to seam cover 50, additional decorative elements 60 are shown along the top of the edging section 30'. As illustrated by arrows A, these decorative elements 60 are advantageously designed to be movable along the visible portion of the border for placement in any desired location. As with seam cover 50, the decorative element 60 can also be formed in other shapes and sizes. End cover 70 is also illustrated for position at a terminal at the end of an edging section, if desired.

Figure 3:
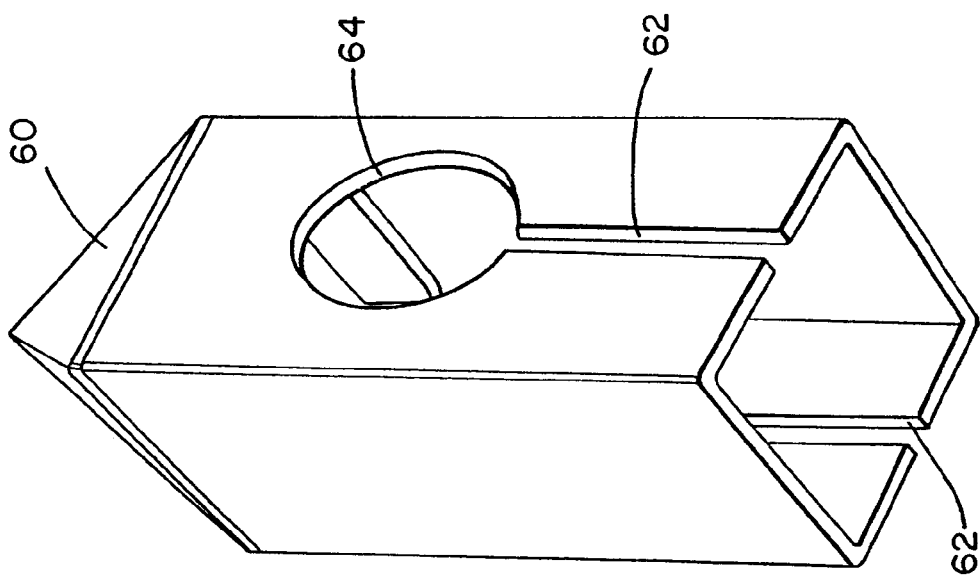

FIG. 3 is a perspective view of the illustrated embodiment of cover 50 and decorative element 60. As illustrated, this cover advantageously comprises key holed shape slots corresponding to the upper portion of the border sections. Specifically, a generally flat slot 62 extends upwardly and is contiguous with a circular opening 64 on two opposing sides of the decorative element 60.

From the above description, it will be appreciated that this same configuration is suitable for cover 50. The sizes of the openings are not shown to scale in the drawings but are preferably designed to allow movement of the element along the top of the edge portion and most preferably to have sufficient friction to avoid undesired movement due to wind or accidental contact after installation. As illustrated, end cover 70 has only one opening. The particular shape of the opening and the particular manner of covering a seam and/or movably attaching a decorative element to a border section can have various shapes and sizes without departing from the scope of the present invention.

Figure 4:
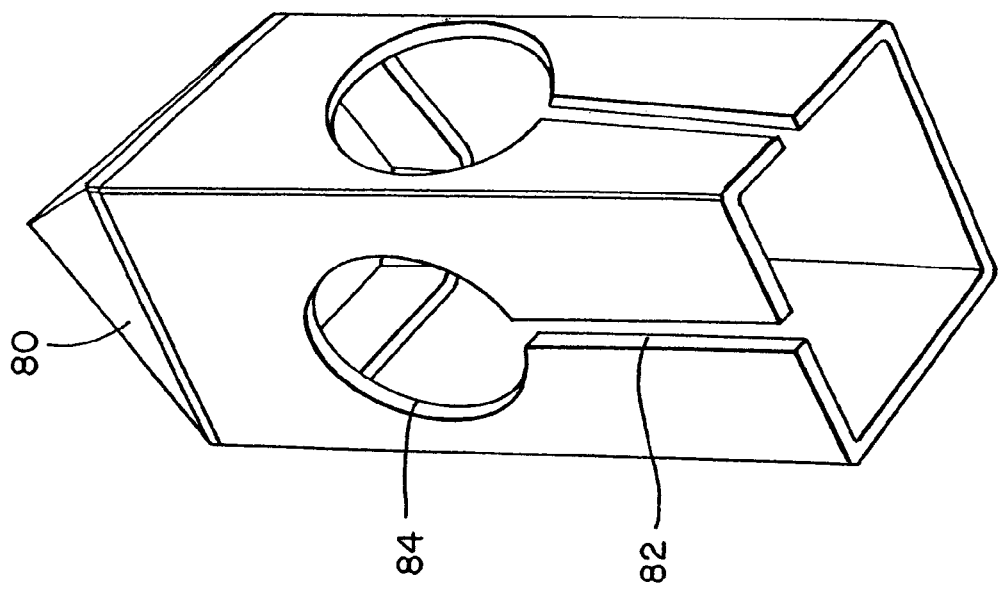
FIGS. 3 and 4 are perspective views of covers/decorative elements of two embodiments of the present invention.

Another form of cover is illustrated in FIG. 4 wherein this cover/decorative element 80 has similar round opening 84 and straight openings 82 on adjacent sides of the cover 80. It will be understood that cover 80 is designed for use on a corner where adjacent edge sections are meeting at an angle. Illustrated cover 80 is most suitable where the adjacent edge sections are meeting at a 90° angle, however, it is within the scope of the present invention to provide covers with openings designed for adjacent edge sections meeting at angles other than 90° or 180° as illustrated.

It will therefore be understood from the present description and drawings that a new, useful, lawn edging is provided which advantageously conceals the seams between adjacent landscaped edge sections and provides flexibility to the end user in decorating lawn edging with and eye to the aesthetics of a desired installation. The advantages of the present invention are particularly suited for lawn edging sold in linear sections but is also applicable to edging particularly marketing in coils or other configurations.

What is claimed is:

1. A landscape edging comprising:
   a first elongated border section comprising a substantially vertical portion, an enlarged upper portion and two end portions;
   a second elongated border section comprising a substantially vertical portion, an enlarged upper portion and two end portions, wherein said first border section and said second border section are disposed in substantial end-to-end relation with an end portion of said first border section disposed proximate an end portion of said second border section thereby defining a seam; and
   a plurality of decorative covers disposed in spaced relation over at least one of said enlarged upper portions, with at least one of said covers disposed over the top of said seam and at least one cover disposed at a position between said end portions of one of said border sections.

2. A landscape edging according to claim 1 wherein said first border section abuts said second border section.

3. A landscape edging according to claim 1 wherein said first border section overlaps said second border section.

4. A landscape edging according to claim 1 wherein said first border section and said second border section are identically shaped.

5. A landscape edging according to claim 4 wherein said sections are extrusions.

6. A landscape edging according to claim 1 comprising a plurality of decorative elements selectively positionable along the top of at least one of said border sections.

7. A landscape edging according to claim 1 comprising a plurality of decorative elements movably positioned on each of said sections.

8. A landscape edging according to claim 1 comprising at least three sections disposed in proximate, end-to-end relation wherein adjacent border sections define a seam, and a cover is disposed over the top of each of a plurality of said seams.

9. A landscape edging according to claim 1 comprising at least four sections disposed in proximate, end-to-end relation wherein adjacent border sections define a seam, and a cover is disposed over the top of each of a plurality of said seams.

10. A landscape edging according to claim 1 wherein said sections comprise generally tubular top portions and said cover is slidable over said tubular portions.

11. A landscape edging according to claim 10 comprising a plurality of decorative elements movably positioned on each of said sections.

12. A landscape edging according to claim 1 further comprising an end cover comprising a first portion comprising an opening to slidingly receive an enlarged upper portion of a border section and a second portion, substantially opposite said first portion, which is not open.

13. A landscape edging according to claim 1 wherein said covers comprise a hollow, polygonal base and a pyramidal top.

14. A landscape edging according to claim 13 wherein said base is rectangular.

15. A landscape edging according to claim 13 wherein said base is square.

16. A landscape edging according to claim 13 wherein said base extends down said substantially vertical portions for a distance of at least about the height of said enlarged upper portion.

17. A landscape edging according to claim 16 wherein at least two sides of said base extend downwardly in spaced relation to said substantially vertical portions.

18. A landscape edging according to claim 1 wherein at least one of said covers comprises two walls disposed at angles to said vertical portion and extending from positions proximate said border section to a position spaced from said border section.

19. A landscape edging according to claim 18 wherein said walls are substantially perpendicular to said substantially vertical portions.

20. A landscape edging comprising:
   a first elongated border section comprising a substantially vertical portion, an enlarged upper portion and two end portions;

a second elongated border section comprising a substantially vertical portion, an enlarged upper portion and two end portions, wherein said first border section and said second border section are disposed in substantial end-to-end relation with an end portion of said first border section disposed proximate an end portion of said second border section thereby defining a seam; and a plurality of decorative covers movably disposed in spaced relation over at least one of said enlarged upper portions and at least one cover disposed at a position between said end portions of one of said border sections.

21. A landscape edging according to claim 20 comprising a plurality of decorative elements movably connected to the top of at least one of said sections.

22. A landscape edging according to claim 21 wherein said decorative elements are slidably connected to the top of at least one of said sections.

23. A landscape edging according to claim 20 wherein a decorative element is slidably connected to the top of at least one of said sections.

24. A landscape edging according to claim 20 further comprising a cover disposed over the top of said seam.

25. A landscape edging according to claim 20 wherein said first border section abuts said second border section.

26. A landscape edging according to claim 20 wherein said first border section overlaps said second border section.

27. A landscape edging according to claim 20 wherein said first border section and said second border section are identically shaped.

28. A landscape edging according to claim 27 wherein said sections are extrusions.

29. A landscape edging according to claim 20 comprising at least three sections disposed in proximate, end-to-end relation wherein adjacent border sections define a seam, and a cover is disposed over the top of each of a plurality of said seams.

30. A landscape edging according to claim 20 comprising at least four sections disposed in proximate, end-to-end relation wherein adjacent border sections define a seam, and a cover is disposed over the top of each of a plurality of said seams.

31. A landscape edging according to claim 20 wherein said sections comprise generally tubular top portions and said cover is slidable over said tubular portions.

32. A landscape edging according to claim 20 further comprising an end cover comprising a first portion comprising an opening to slidingly receive an enlarged upper portion of a border section and a second portion, substantially opposite said first portion which is not open.

33. A landscape edging according to claim 20 wherein said covers comprise a hollow, polygonal base and a pyramidal top.

34. A landscape edging according to claim 33 wherein said base is rectangular.

35. A landscape edging according to claim 33 wherein said base is square.

36. A landscape edging according to claim 33 wherein said base extends down said substantially vertical portions for a distance of at least about the height of said enlarged upper portion.

37. A landscape edging according to claim 36 wherein at least two sides of said base extend downwardly in spaced relation to said substantially vertical portions.

38. A landscape edging according to claim 20 wherein at least one of said covers comprises two walls disposed at angles to said vertical portion and extending from positions proximate said border section to a position spaced from said border section.

39. A landscape edging according to claim 38 wherein said walls are substantially perpendicular to said substantially vertical portions.

* * * * *